United States Patent
Ogawa et al.

(10) Patent No.: US 8,629,521 B2
(45) Date of Patent: Jan. 14, 2014

(54) SEMICONDUCTOR DEVICE USED FOR ADJUSTMENT OF OUTPUT OF A HALL ELEMENT

(75) Inventors: Takashi Ogawa, Ogaki (JP); Hironori Terazawa, Ichinomiya (JP); Akihiro Hasegawa, Hashima (JP); Takashi Naruse, Gifu-ken (JP); Yuuhei Mouri, Ichinomiya (JP)

(73) Assignee: ON Semiconductor Trading, Ltd., Hamilton (BM)

( * ) Notice: Subject to any disclaimer, the term of this patent is extended or adjusted under 35 U.S.C. 154(b) by 153 days.

(21) Appl. No.: 13/215,584

(22) Filed: Aug. 23, 2011

(65) Prior Publication Data

US 2012/0049303 A1    Mar. 1, 2012

(30) Foreign Application Priority Data

Aug. 26, 2010   (JP) ................. 2010-189529

(51) Int. Cl.
*G01R 21/08* (2006.01)
*G01R 33/07* (2006.01)
*G01R 15/20* (2006.01)

(52) U.S. Cl.
USPC ............ 257/426; 257/E43.002; 257/E43.003; 257/E27.005; 324/117 H; 327/306; 338/32 H

(58) Field of Classification Search
USPC .............. 257/426–427, E43.001–E43.007, 257/E27.005; 324/117 H, 207.2–207.21, 324/251–252; 327/96, 306–307, 309; 338/32 R, 32 H
See application file for complete search history.

(56) References Cited

U.S. PATENT DOCUMENTS

| | | | |
|---|---|---|---|
| 4,760,285 A * | 7/1988 | Nelson .......................... | 327/511 |
| 5,604,433 A * | 2/1997 | Theus et al. ................... | 324/251 |
| 5,914,635 A * | 6/1999 | Yamamoto ..................... | 327/561 |
| 6,014,091 A * | 1/2000 | Noltemeyer et al. ............ | 341/7 |
| 6,064,202 A * | 5/2000 | Steiner et al. .................. | 324/251 |
| 6,522,131 B1 * | 2/2003 | Hiligsmann et al. ........ | 324/207.2 |
| 6,657,475 B1 * | 12/2003 | Zahn .............................. | 327/309 |
| 6,727,693 B2 * | 4/2004 | Altrichter et al. ............. | 324/251 |
| 6,777,932 B2 * | 8/2004 | Hara et al. ..................... | 324/251 |
| 6,794,863 B2 * | 9/2004 | Hatanaka ....................... | 324/251 |
| 6,861,839 B2 * | 3/2005 | Hara et al. ..................... | 324/251 |
| 6,995,531 B2 * | 2/2006 | Ichimaru et al. ......... | 318/400.29 |
| 7,049,812 B2 * | 5/2006 | Hara et al. ..................... | 324/251 |
| 7,119,538 B2 * | 10/2006 | Blossfeld ....................... | 324/251 |
| 7,202,771 B2 * | 4/2007 | Bohlinger ..................... | 338/32 R |
| 7,659,716 B2 * | 2/2010 | Nishikawa ..................... | 324/244 |

(Continued)

*Primary Examiner* — Laura Menz
*Assistant Examiner* — Maliheh Malek
(74) *Attorney, Agent, or Firm* — Osha Liang LLP

(57) ABSTRACT

A semiconductor device includes a Hall element, which is switched between a first and second mode. In the first mode, connection A between a first and second resistor and connection C between a third and fourth resistor are set to Vcc or GND. Connection D between the first and fourth resistor and connection B between the second and third resistor are set as output terminals. In the second mode, D and B are set to Vcc or GND and A and C are set as output terminals. When a first line placed along the second resistor and connected to A is set at Vcc in the first mode, a second line placed along the fourth resistor and connected to D is set at Vcc in the second mode. When the first line is set at GND in first mode, the second line is set at GND in the second mode.

15 Claims, 8 Drawing Sheets

(56) References Cited

U.S. PATENT DOCUMENTS

| | | | |
|---|---|---|---|
| 7,701,208 B2* | 4/2010 | Nishikawa | 324/251 |
| 7,855,554 B2* | 12/2010 | Oohira | 324/251 |
| 8,274,281 B2* | 9/2012 | Sugiura | 324/251 |
| 8,339,132 B2* | 12/2012 | Honkura et al. | 324/244 |
| 8,390,282 B2* | 3/2013 | Utsunomiya | 324/251 |
| 2003/0213611 A1* | 11/2003 | Morita | 174/126.2 |
| 2004/0129934 A1* | 7/2004 | Takatsuka | 257/40 |
| 2004/0130317 A1* | 7/2004 | Hatanaka | 324/207.2 |
| 2005/0258820 A1* | 11/2005 | Forster | 324/165 |
| 2008/0030191 A1* | 2/2008 | Nishikawa | 324/252 |
| 2008/0048772 A1* | 2/2008 | Nishikawa | 327/544 |
| 2008/0265880 A1* | 10/2008 | Nishikawa | 324/251 |
| 2009/0115412 A1* | 5/2009 | Fuse | 324/252 |
| 2010/0213932 A1* | 8/2010 | Utsunomiya | 324/251 |
| 2010/0308801 A1* | 12/2010 | Ogawa et al. | 324/207.2 |
| 2010/0308886 A1* | 12/2010 | Ogawa | 327/307 |

* cited by examiner

SEMICONDUCTOR DEVICE USED FOR ADJUSTMENT OF OUTPUT OF A HALL ELEMENT

CROSS-REFERENCE TO RELATED APPLICATIONS

The present application claims priority from Japanese Patent Application No. 2010-189529 filed on Aug. 26, 2010. The entire disclosure of Japanese Patent Application No. 2010-189529 filed on Aug. 26, 2010, including specification, claims, drawings, and abstract, is incorporated herein by reference in its entirety.

BACKGROUND OF INVENTION

1. Technical Field

One or more embodiments of the present invention relate to a semiconductor device which is used for adjustment of output of a Hall element or the like.

2. Background Art

Recently, in an image stabilization circuit of an imaging device such as a digital still camera and a digital video camera or in a vibration circuit of a portable phone, a position detecting circuit which uses a Hall element for detecting a position of an optical element such as a lens and a vibrating element is used.

An equivalent circuit of the Hall element is represented as a bridge circuit of resistors R1~R4. An output signal of the Hall element contains an offset component because of influences of variations of the resistors, according to a combination of a terminal to which a power supply voltage Vcc is applied and a terminal from which the output signal is output.

Because of this, as shown in FIG. 8, an offset cancelling circuit 100 is used which includes a Hall element 10, an amplification circuit 12, and an averaging circuit 14. The offset cancelling circuit 100 is formed as a semiconductor device formed over a semiconductor substrate along with other peripheral circuits. The averaging circuit 14 comprises switching elements S9~S19, capacitors C1~C4, an operational amplifier 14a, and a reference voltage generating circuit 14b. The switching elements S9~S19 connect some of output terminals of operational amplifiers 12a and 12b, terminals of the capacitors C1~C4, and an input terminal of the operational amplifier 14a to each other.

A switching element S1 is switched ON and a switching element S6 is switched OFF so that the power supply voltage Vcc is applied to a connection point A of the resistors R1 and R2, a switching element S2 is switched ON and a switching element S8 is switched OFF so that a connection point C of the resistors R3 and R4 is grounded, a switching element S7 is switched ON and a switching element S4 is switched OFF so that a connection point D of the resistors R1 and R4 is connected to a non-inverting input terminal (+) of the operational amplifier 12b, and a switching element S5 is switched ON and a switching element S3 is switched OFF so that a connection point B of the resistors R2 and R3 is connected to a non-inverting input terminal (+) of the operational amplifier 12a. In addition, of the switching elements S9~S19, the switching elements S13 and S14 are switched ON and all other switching elements are switched OFF so that an output of the operational amplifier 12a is connected to a positive terminal of the capacitor C1 and an output of the operational amplifier 12b is connected to a negative terminal of the capacitor C1. Thus, a state is realized in which the capacitor C1 is charged by the output voltages of the operational amplifiers 12a and 12b.

Then, the switching element S6 is switched ON and the switching element S1 is switched OFF so that the connection point A of the resistors R1 and R2 is connected to the non-inverting input terminal (+) of the operational amplifier 12a, the switching element S8 is switched ON and the switching element S2 is switched OFF so that the connection point C of the resistors R3 and R4 is connected to the non-inverting input terminal (+) of the operational amplifier 12b, the switching element S4 is switched ON and the switching element S7 is switched OFF so that the connection point D of the resistors R1 and R4 is grounded, and the switching element S3 is switched ON and the switching element S5 is switched OFF so that the power supply voltage Vcc is applied to the connection point B of the resistors R2 and R3. In addition, of the switching element S9~S19, the switching element S15 and S16 are switched ON and all other switching elements are switched OFF so that the output of the operational amplifier 12a is connected to a negative terminal of the capacitor C2 and the output of the operational amplifier 12b is connected to a positive terminal of the capacitor C2. Thus, a state is realized in which the capacitor C2 is charged by the output voltages of the operational amplifiers 12a and 12b.

In this manner, the circuit is switched between two modes in which voltages are applied to change direction of the current flowing in the Hall element 10, and the capacitors C1 and C2 are charged with Hall voltages V1 and V2 in two directions (90°) for four terminals of the Hall element 10. The charging voltage V1 has a value in which an offset voltage Voff is added to the Hall voltage Vhall in the first mode. That is, the charging voltage V1=Vhall+Voff. When the current flowing to the Hall element 10 is changed by 90°, the offset voltage Voff of the Hall element 10 appears in an opposite direction, and thus the charging voltage V2 has a value in which the offset voltage Voff is subtracted from the Hall voltage Vhall in the second mode. That is, the charging voltage V2=Vhall−Voff.

In an output state, switching elements S13~S16 are switched OFF, to disconnect the operational amplifiers 12a and 12b and the capacitors C1 and C2. In addition, the switching elements S11, S12, and S19 are switched ON and the switching element S18 is switched OFF so that the positive terminals of the capacitors C1 and C2 are commonly connected to one end of the input terminal of the operational amplifier 14a through a capacitor C4. Moreover, the switching elements S9 and S10 are switched ON so that the negative terminals of the capacitors C1 and C2 are commonly connected to the other end of the input terminal of the operational amplifier 14a. The other end of the operational amplifier 14a is set at Vref generated by a reference voltage generating circuit 14Q. The switching element S17 for deleting charge of a capacitor C3 is also set to the OFF state.

When the circuit is set in such an output state, the capacitors C1 and C2 are connected in parallel, and the charges stored in the capacitors C1 and C2 are re-distributed to the capacitors C1~C4, so that the charging voltages V1 and V2 are averaged. With this process, the offset value Voff of the output voltage of the Hall element 10 is cancelled, and the output voltage Vout is output.

As shown in FIG. 9, the Hall element 10 is formed as a bridge circuit of resistors R1~R4 over a semiconductor substrate. In the Hall element 10, a line L1 extends from the connection point A of the resistors R1 and R2 along the resistor R2 in a direction toward a position where the resistor R3 is placed. A line L2 extends from the connection point D of the resistors R1 and R4 along the resistor R4 in a direction toward a position where the resistor R3 is placed. A line L3 extends from the connection point B of the resistors R2 and R3 in a direction away from the resistor R3. A line L4 extends from the connection point C of the resistors R3 and R4 in a direction away from the resistor R3. In the Hall element 10 having such a layout of lines, the application state of voltages is switched using the lines L1~L4 when the capacitor C1 is charged or when the capacitor C2 is charged.

In the offset cancelling circuit 100 of the related art, a configuration is employed in which the circuit is switched between the first mode as shown in FIG. 10 in which the power supply voltage Vcc is applied from the line L1, the line L4 is grounded, and the outputs of the Hall element 10 are obtained from the lines L2 and L3 and the second mode as shown in FIG. 11 in which the power supply voltage Vcc is applied from the line L3, the line L2 is grounded, and the outputs of the Hall element 10 are obtained from the lines L1 and L4.

The resistors R1~R4 of the Hall element 10 are influenced by the voltages applied to nearby lines L1~L4, and the respective resistance values vary. In particular, in the offset cancelling circuit 100, the resistor R2 formed along the line L1 tends to be influenced by the voltage applied to the line L1, and the resistor R4 formed along the line L2 tends to be influenced by the voltage applied to the line L2. In other words, while in the first mode, the resistor R2 is influenced by the power supply voltage Vcc and the resistor R4 is influenced by the output voltage of the Hall element 10, in the second mode, the resistor R2 is influenced by the output voltage of the Hall element 10 and the resistor R4 is influenced by the ground voltage.

As described, in the offset cancelling circuit 100, the influences of the lines L1~L4 on the resistors R1~R4 are not symmetric in the first mode and the second mode. Additionally, the offset due to the influences of lines L1~L4 is superposed on the output from the Hall element 10, which cannot be cancelled by the offset cancelling circuit 100.

SUMMARY OF INVENTION

According to one aspect of one or more embodiments of the present invention, there is provided a semiconductor device comprising a Hall element represented by an equivalent circuit in which a first resistive element, a second resistive element, a third resistive element, and a fourth resistive element are sequentially connected in a quadrangular loop, wherein the semiconductor device is switched between a first mode in which a first connection point between the first resistive element and the second resistive element and a second connection point between the third resistive element and the fourth resistive element are exclusively set at a power supply potential or a ground potential and a third connection point between the first resistive element and the fourth resistive element and a fourth connection point between the second resistive element and the third resistive element are set as output terminals, and a second mode in which the third connection point and the fourth connection point are exclusively set at the power supply potential or the ground potential and the first connection point and the second connection point are set as the output terminals, and, when a first line placed along the second resistive element and connected to the first connection point is set at the power supply potential in the first mode, a second line placed along the fourth resistive element and connected to the third connection point is set at the power supply potential in the second mode, and when the first line is set at the ground potential in the first mode, the second line is set at the ground potential in the second mode.

BRIEF DESCRIPTION OF THE DRAWINGS

One or more embodiments of the present invention will be described in further detail based on the following drawings, wherein.

DETAILED DESCRIPTION

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

Figure 1:
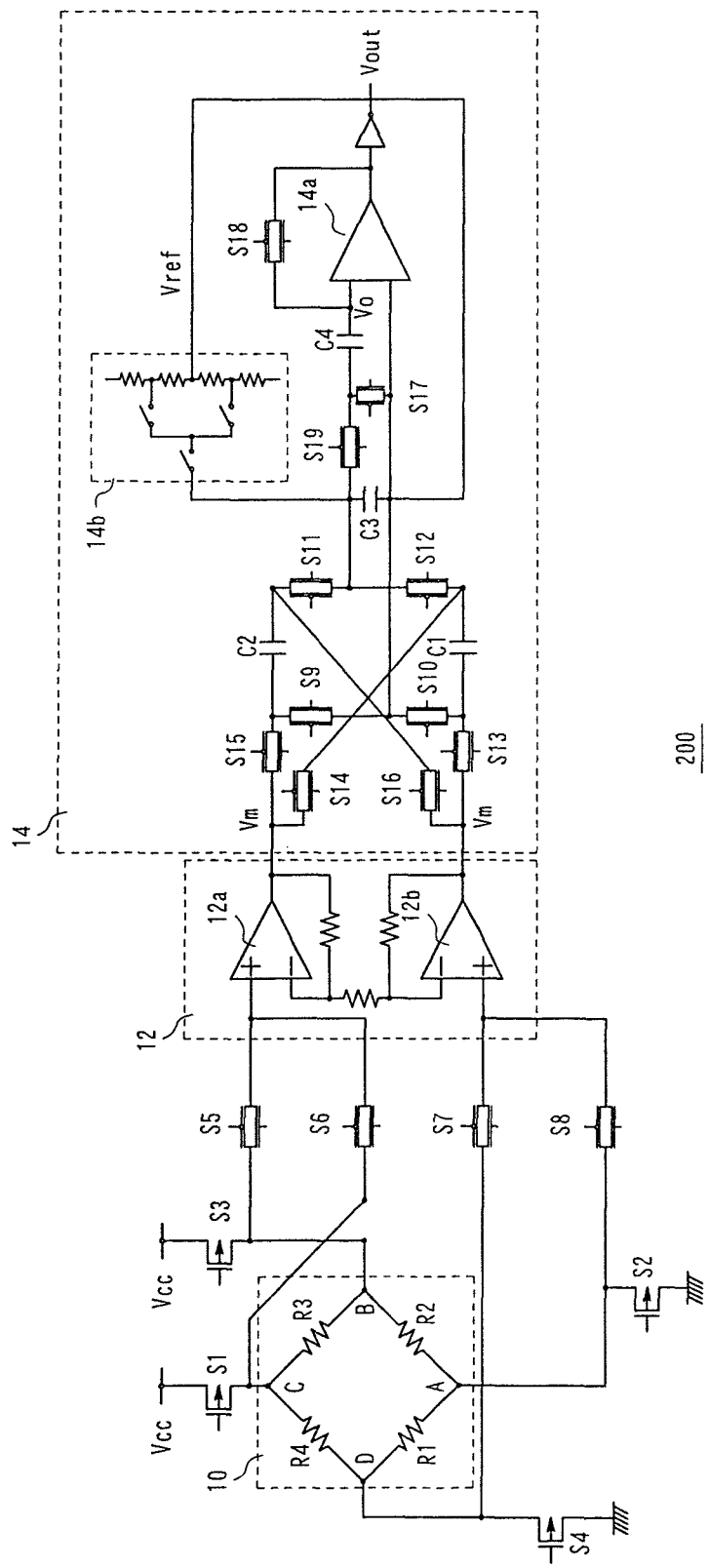
FIG. 1 is a diagram showing a structure of an off set cancelling circuit in accordance with one or more embodiments of the present invention.

FIG. 1 is a diagram showing a structure of an offset cancelling circuit 200 in accordance with one or more embodiments of the present invention. The offset cancelling circuit 200 is formed as a semiconductor device formed over a semiconductor substrate along with other peripheral circuits. The offset cancelling circuit 200 comprises a Hall element 10, an amplification circuit 12, and an averaging circuit 14. The offset cancelling circuit 200 has a connection relationship of circuits with respect to the connection points which differs from that in the Hall element 10 of the offset cancelling circuit 100 of the related art.

Figure 9:
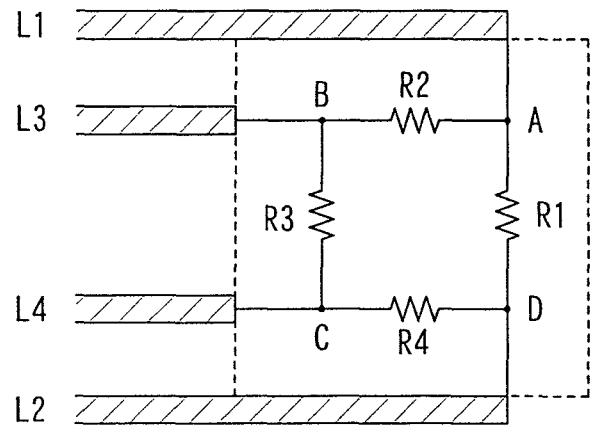
FIG. 9 is a diagram showing a structure of a Hall element.
Figure 10:
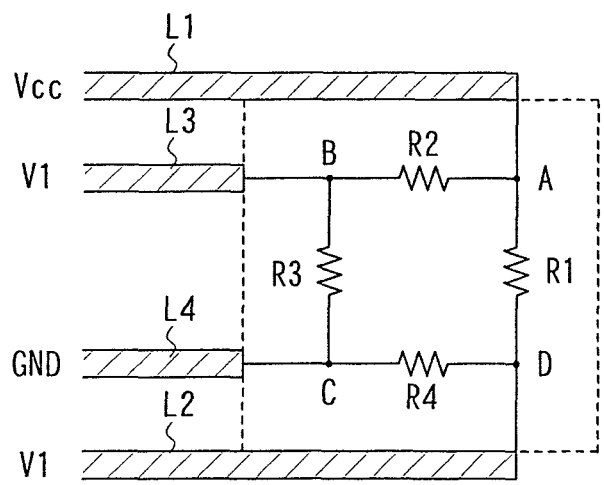
FIG. 10 is a diagram showing a connection relationship of a Hall element in a first mode of an offset cancelling circuit in related art.
Figure 11:
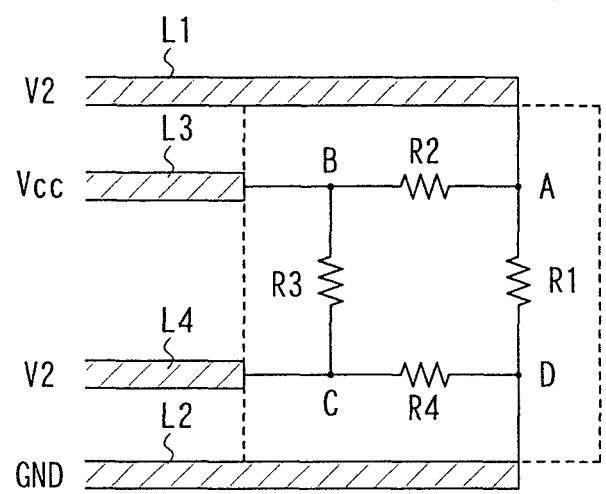
FIG. 11 is a diagram showing a connection relationship of a Hall element in a second mode of an offset cancelling circuit in related art.

As shown in FIG. 9, the Hall element 10 can be represented as a bridge circuit of resistors R1~R4. Switching elements S1~S8 which switch the connection points A~D of the resistors R1~R4 to a power supply voltage Vcc, ground, or an output are connected to the resistors R1~R4.

The amplification circuit 12 comprises operational amplifiers 12a and 12b. The operational amplifier 12a amplifies a voltage which is input to a non-inverting input terminal (+) and outputs the amplified voltage. The operational amplifier 12b amplifies a voltage which is input to a non-inverting input terminal (+) and outputs the amplified voltage.

The averaging circuit 14 comprises switching elements S9~S19, capacitors C1~C4, an operational amplifier 14a, and a reference voltage generating circuit 14b. The switching elements S9~S19 connect some of output terminals of the operational amplifiers 12a and 12b, terminals of the capacitors C1~C4, and an input terminal of the operational amplifier 14a to each other.

The switching element S1 is switched ON and the switching element S6 is switched OFF so that the power supply voltage Vcc is applied to the connection point C of the resistors R3 and R4, the switching element S2 is switched ON and the switching element S8 is switched OFF so that the connection point A of the resistors R1 and R2 is grounded, the switching element S7 is switched ON and the switching element S4 is switched OFF so that the connection point D of resistors R1 and R4 is connected to the non-inverting input terminal (+) of the operational amplifier 12b, and the switching element S5 is switched ON and the switching element S3 is switched OFF so that the connection point B of the resistors R2 and R3 is connected to the non-inverting input terminal (+) of the operational amplifier 12a. In addition, of the switching elements S9~S19, the switching elements S13 and S14 are switched ON and all other switching elements are switched OFF so that the output of the operational amplifier 12a is connected to a positive terminal of the capacitor C1 and the output of the operational amplifier 12b is connected to a negative terminal of the capacitor C1. Thus, a state is realized in which the capacitor C1 is charged by the output voltages of the operational amplifiers 12a and 12b.

Then, the switching element S6 is switched ON and the switching element S1 is switched OFF so that the connection point C of the resistors R3 and R4 is connected to the non-inverting input terminal (+) of the operational amplifier 12a, the switching element S8 is switched ON and the switching element S2 is switched OFF so that the connection point A of the resistors R1 and R2 is connected to the non-inverting input terminal (+) of the operational amplifier 12b, the switching element S4 is switched ON and the switching element S7 is switched OFF so that the connection point D of the resistors R1 and R4 is grounded, and the switching element S3 is switched ON and the switching element S5 is switched OFF so that the power supply voltage Vcc is applied to the connection point B of the resistors R2 and R3. In addition, of the switching elements S9~S19, the switching elements S15 and S16 are switched ON and all other switching elements are switched OFF, so that the output of the operational amplifier 12a is connected to a negative terminal of the capacitor C2 and the output of the operational amplifier 12b is connected to a positive terminal of the capacitor C2. Thus, a state is realized in which the capacitor C2 is charged by the output voltages of the operational amplifiers 12a and 12b.

In this manner, the circuit is switched between two modes in which voltages are applied to change the direction of current flowing in the Hall element 10, and the capacitors C1 and C2 are charged with Hall voltages V1 and V2 of two directions (90°) for four terminals of the Hall element 10. The charging voltage V1 has a value in which the offset voltage Voff is added to the Hall voltage Vhall in the first mode. That is, the charging voltage V1=Vhall+Voff. When the current flowing to the Hall element 10 is changed by 90°, the offset voltage Voff of the Hall element 10 would appear in an opposite direction, and therefore, the charging voltage V2 has a value in which the offset voltage Voff is subtracted from the Hall voltage Vhall in the second mode. That is, the charging voltage V2=Vhall−Voff.

In an output state, the switching elements S13~S16 are switched OFF, to disconnect the operational amplifiers 12a and 12b and the capacitors C1 and C2. In addition, the switching elements S11, S12, and S19 are switched ON and the switching element S18 is switched OFF so that the positive terminals of the capacitors C1 and C2 are commonly connected to one end of an input terminal of the operational amplifier 14a through a capacitor C4. Moreover, the switching elements S9 and S10 are switched ON so that the negative terminals of the capacitors C1 and C2 are connected to the other end of the input terminal of the operational amplifier 14a. The other end of the operational amplifier 14a is set to Vref which is generated by a reference voltage generating circuit 14Q. The switching element S17 for removing charges of a capacitor C3 is also set to the OFF state.

When such an output state is realized, the capacitors C1 and C2 are connected in parallel. The charges stored in the capacitors C1 and C2 are re-distributed to the capacitors C1~C4, and the charging voltages V1 and V2 are averaged. With this process, the offset value Voff of the output voltage of the Hall element 10 is cancelled, and the output voltage Vout is output.

Figure 2:
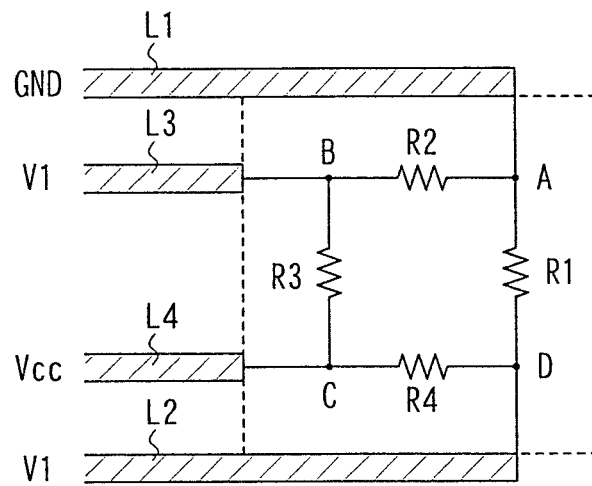
FIG. 2 is a diagram showing a connection relationship of a Hall element in a first mode of an offset cancelling circuit in accordance with one or more embodiments of the present invention.
Figure 3:
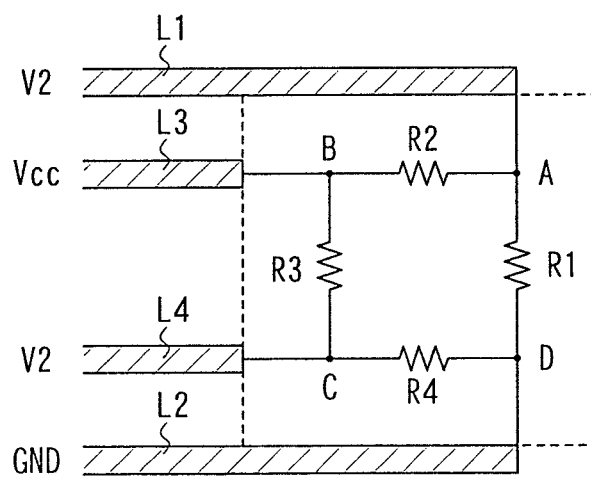
FIG. 3 is a diagram showing a connection relationship of a Hall element in a second mode of an offset cancelling circuit in accordance with one or more embodiments of the present invention.

In the offset cancelling circuit 200 of one or more embodiments of the present invention, in the first mode, as shown in FIG. 2, the power supply voltage Vcc is applied from a line L4 (connection point C) of the Hall element 10, a line L1 (connection point A) is grounded, and an output V1 of the Hall element 10 is obtained from a line L2 (connection point D) and a line L3 (connection point B). In addition, in the second mode, as shown in FIG. 3, the power supply voltage Vcc is applied from the line L3 (connection point B) of the Hall element 10, the line L2 (connection point D) is grounded, and an output V2 of the Hall element 10 is obtained from the line L1 (connection point A) and the line L4 (connection point C).

In this configuration, in the first mode, the resistor R2 placed along the line L1 in parallel with the line L1 is influenced by the ground potential GND and the resistor R4 placed along the line L2 in parallel with the line L2 is influenced by the output V1. On the other hand, in the second mode, the resistor R2 placed along the line L1 is influenced by the output V2 and the resistor R4 placed along the line L2 is influenced by the ground potential GND. The lines L3 and L4 are not placed in parallel with the resistors R1~R4 of the Hall element 10 and are placed to extend away from the Hall element 10 at an early stage, and thus the influence of the lines L3 and L4 on the Hall element 10 is small.

Here, the output V1 and the output V2 have approximately the same values, and the influences an the Hall element 10 are approximately the same. Therefore, in the offset cancelling circuit 200, the influences by the lines L1 and L2 become geometrically symmetric in the first mode and the second mode, and the influences are approximately equal in the first mode and the second mode. Thus, the influences of the change of the resistors R1~R4 due to application situation of voltages to the Hall element 10 in the first mode and the second mode are cancelled in the output state, and the output voltage of the offset cancelling circuit 200 is not significantly influenced.

Figure 4:
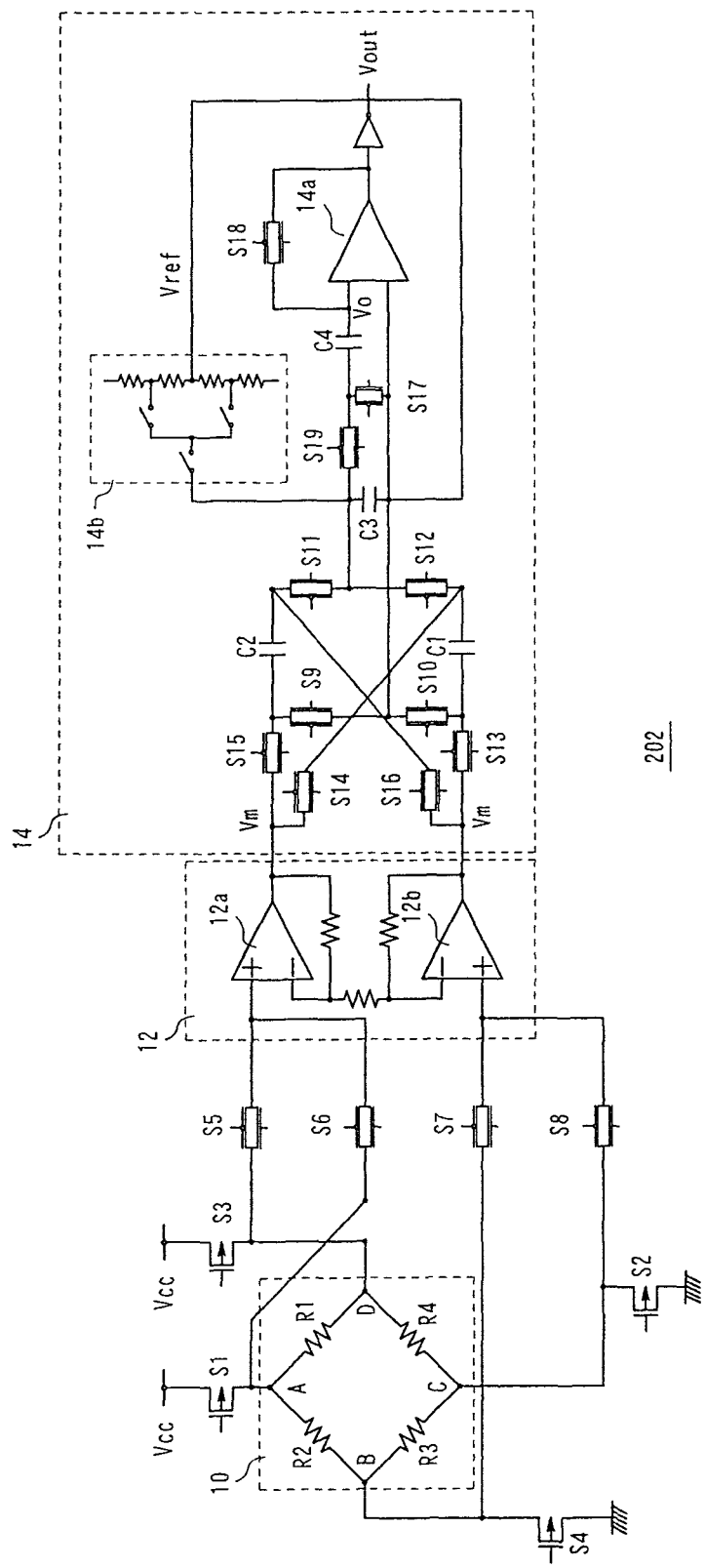
FIG. 4 is a diagram showing a structure of an offset cancelling circuit in an alternative configuration in accordance with one or more embodiments of the present invention.

Alternatively, the offset cancelling circuit 202 as shown in FIG. 4 may be employed. In the offset cancelling circuit 202, the connection relationship of circuits with respect to the connection points A~D of the Hall element 10 differ from those of the offset cancelling circuit 200.

Figure 5:
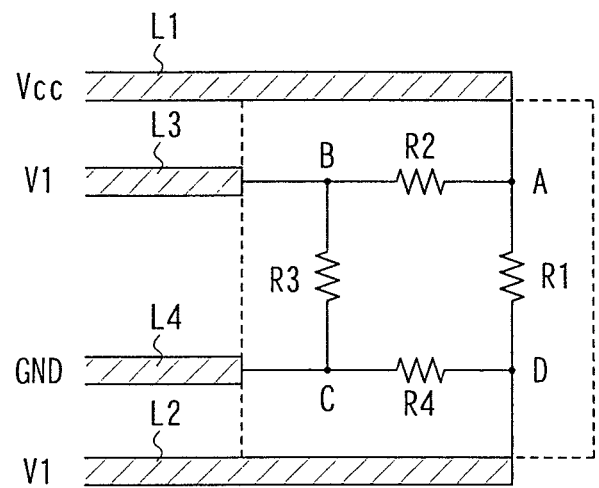
FIG. 5 is a diagram showing a connection relationship of a Hall element in a first mode of an offset cancelling circuit of an alternative configuration.
Figure 6:
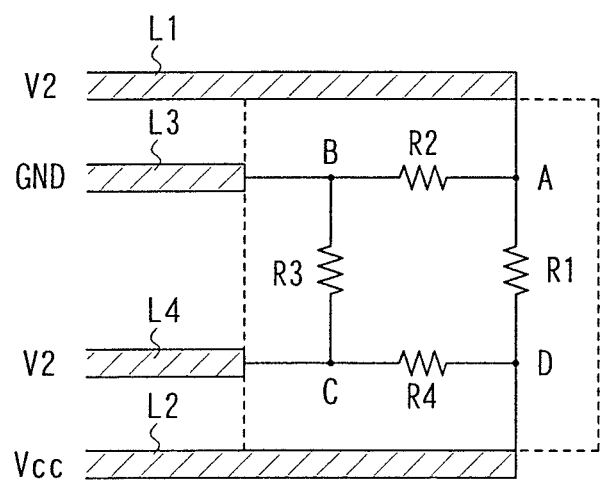
FIG. 6 is a diagram showing a connection relationship of a Hall element in a second mode of an offset cancelling circuit of an alternative configuration.

In the offset cancelling circuit 202, in the first mode, as shown in FIG. 5, the power supply voltage Vcc is applied from the line L1 (connection point A) of the Hall element 10, the line L4 (connection point C) is grounded, and the output V1 of the Hall element 10 is obtained from the line L2 (connection point D) and the line L3 (connection point B). In the second mode, as shown in FIG. 6, the power supply voltage Vcc is applied from the line L2 (connection point D) of the Hall element 10, the line L3 (connection point B) is grounded, and the output V2 of the Hall element 10 is obtained from the line L1 (connection point A) and the line L4 (connection point C).

In this configuration, in the first mode, the resistor R2 placed along the line L1 is influenced by the power supply voltage Vcc, and the resistor R4 placed along the line L2 is influenced by the output V1. On the other hand, in the second mode, the resistor R2 placed along the line L1 is influenced by the output V2 and the resistor R4 placed along the line L2 is influenced by the power supply voltage Vcc. Here, because the output V1 and the output V2 have approximately the same value as described above, the influences on the Hall element 10 are also approximately the same.

As described, in the offset cancelling circuit 202 of one or more embodiments of the present invention, the influences of the lines L1 and L2 are geometrically symmetric in the first mode and the second mode, and the influences are approximately the same between the first mode and the second mode. Therefore, the influences of changes of the resistors R1~R4 due to application situation of voltages with respect to the Hall element 10 in the first mode and the second mode are cancelled in the output state, and the output voltage of the offset cancelling circuit 202 is not significantly influenced.

However, the offset cancelling circuit 200 in which the ground voltage GND is applied to the lines L1 and L2 has lower influence on the resistors R2 and R4 than the offset cancelling circuit 202 in which the power supply voltage Vcc is applied to the lines L1 and L2 placed along the resistors R2 and R4, and therefore, the offset cancelling circuit 200 may avoid the influences of the applied voltage.

Figure 7:
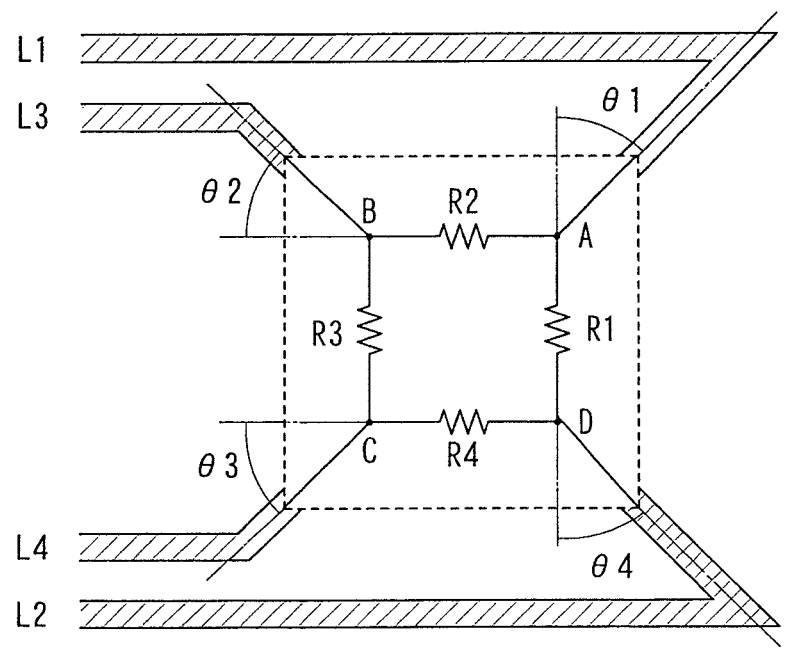
FIG. 7 is a diagram showing another configuration of a Hall element in accordance with one or more embodiments of the present invention.
Figure 8:
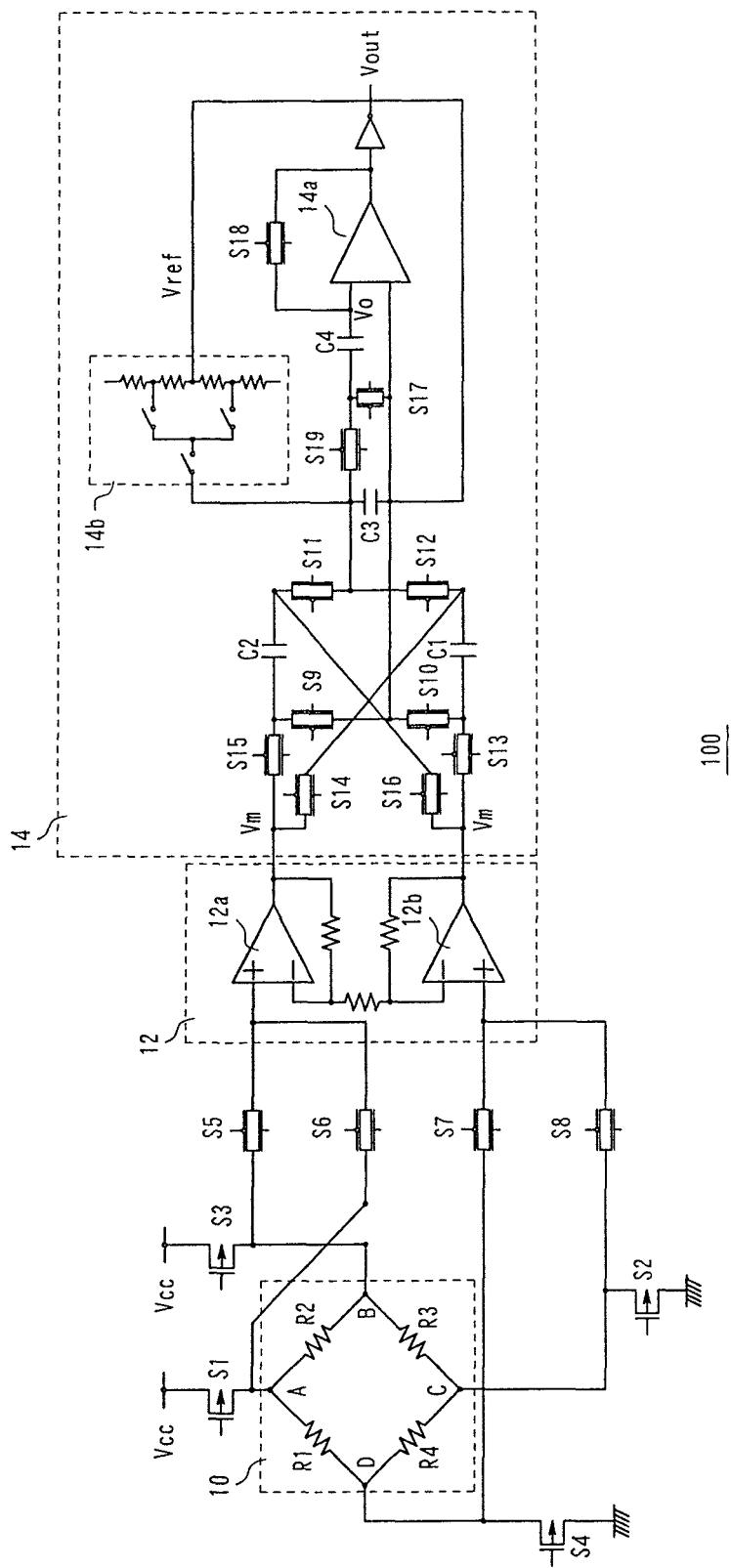
FIG. 8 is a diagram showing a structure of an offset cancelling circuit in related art.

In addition, in the offset cancelling circuits 200 and 202, it may be advantageous to change the Hall element 10 to a Hall element 20 shown below. As shown in FIG. 7, the Hall element 20 has a structure in which the lines L1~L4 are formed in a direction of angles θ1~θ4 which are not parallel to any of the directions of extension of the resistors R1~R4. The angles θ1~θ4 may be set to 45°.

With this structure, the lines L1~L4 extend to a position more distant from the resistors R1~R4 immediately after the connection points A~D of the resistors R1~R4, and the lines L1~L4 extend at positions distant from the resistor R1~R4 compared to the Hall element 10. Therefore, the influences from the lines L1~L4 can be further reduced.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A semiconductor device comprising:
a Hall element represented by an equivalent circuit in which a first resistive element, a second resistive element, a third resistive element, and a fourth resistive element are sequentially connected in a quadrangular loop,
wherein the semiconductor device is switched between a first mode and a second mode,
wherein, in the first mode, a first connection point between the first resistive element and the second resistive element is set at a ground potential and a second connection point between the third resistive element and the fourth resistive element is set at a power supply potential, and a third connection point between the first resistive element and the fourth resistive element and a fourth connection point between the second resistive element and the third resistive element are set as output terminals, and
wherein, in the second mode, the third connection point is set at the ground potential and the fourth connection point is set at the power supply potential and the first connection point and the second connection point are set as the output terminals, and
wherein, in the first mode, a first line that is located adjacent to the second resistive element and connected to the first connection point is set at the ground potential, and,
wherein, in the second mode, a second line that is located adjacent to the fourth resistive element and connected to the third connection point is set at the ground potential.

2. The semiconductor device according to claim 1,
wherein, in the first mode, the first line is set at the ground potential so that the first connection point is set at the ground potential and the second connection point is set at the power supply potential, and
wherein, in the second mode, the second line is set at the ground potential so that the third connection point is set at the ground potential and the fourth connection point is set at the power supply potential.

3. The semiconductor device according to claim 1,
wherein, in the first mode, the second line is used as a line for output, and
wherein, in the second mode, the first line is used as the line for output.

4. The semiconductor device according to claim 2,
wherein, in the first mode, the second line is used as a line for output, and
wherein, in the second mode, the first line is used as the line for output.

5. The semiconductor device according to claim 1,
wherein the first line extends from the first connection point at an angle which is not parallel to any of directions of extension of the first resistive element, the second resistive element, the third resistive element, and the fourth resistive element, and
wherein the second line extends from the third connection point at an angle which is not parallel to any of the directions of extension of the first resistive element, the second resistive element, the third resistive element, and the fourth resistive element.

6. The semiconductor device according to claim 2,
wherein the first line extends from the first connection point at an angle which is not parallel to any of directions of extension of the first resistive element, the second resistive element, the third resistive element, and the fourth resistive element, and
wherein the second line extends from the third connection point at an angle which is not parallel to any of the directions of extension of the first resistive element, the second resistive element, the third resistive element, and the fourth resistive element.

7. The semiconductor device according to claim 3,
wherein the first line extends from the first connection point at an angle which is not parallel to any of directions of extension of the first resistive element, the second resistive element, the third resistive element, and the fourth resistive element, and
wherein the second line extends from the third connection point at an angle which is not parallel to any of the directions of extension of the first resistive element, the second resistive element, the third resistive element, and the fourth resistive element.

8. A semiconductor device comprising:
a Hall element represented by an equivalent circuit in which a first resistive element, a second resistive element, a third resistive element, and a fourth resistive element are sequentially connected in a quadrangular loop,
wherein the semiconductor device is switched between a first mode and a second mode,
   wherein, in the first mode, a first connection point between the first resistive element and the second resistive element is set at a power supply potential and a second connection point between the third resistive element and the fourth resistive element is set at a ground potential, and a third connection point between the first resistive element and the fourth resistive element and a fourth connection point between the second resistive element and the third resistive element are set as output terminals, and
   wherein, in the second mode, the third connection point is set at the power supply potential and the fourth connection point is set at the ground potential and the first connection point and the second connection point are set as the output terminals, and
wherein, in the first mode, a first line that is located adjacent to the second resistive element and connected to the first connection point is set at the power supply potential, and
wherein, in the second mode, a second line that is located adjacent to the fourth resistive element and connected to the third connection point is set at the power supply potential.

9. The semiconductor device according to claim 8,
wherein, in the first mode, the first line is set at the power supply potential so that the first connection point is set at the power supply potential and the second connection point is set at the ground potential, and
wherein, in the second mode, the second line is set at the power supply potential so that the third connection point is set at the power supply potential and the fourth connection point is set at the ground potential.

10. The semiconductor device according to claim 8,
wherein, in the first mode, the second line is used as a line for output, and
wherein, in the second mode, the first line is used as the line for output.

11. The semiconductor device according to claim 9,
wherein, in the first mode, the second line is used as a line for output, and
wherein, in the second mode, the first line is used as the line for output.

12. The semiconductor device according to claim 8,
wherein the first line extends from the first connection point at an angle which is not parallel to any of directions of extension of the first resistive element, the second resistive element, the third resistive element, and the fourth resistive element, and
wherein the second line extends from the third connection point at an angle which is not parallel to any of the directions of extension of the first resistive element, the second resistive element, the third resistive element, and the fourth resistive element.

13. The semiconductor device according to claim 9,
wherein the first line extends from the first connection point at an angle which is not parallel to any of directions of extension of the first resistive element, the second resistive element, the third resistive element, and the fourth resistive element, and
wherein the second line extends from the third connection point at an angle which is not parallel to any of the directions of extension of the first resistive element, the second resistive element, the third resistive element, and the fourth resistive element.

14. The semiconductor device according to claim 10,
wherein the first line extends from the first connection point at an angle which is not parallel to any of directions of extension of the first resistive element, the second resistive element, the third resistive element, and the fourth resistive element, and
wherein the second line extends from the third connection point at an angle which is not parallel to any of the directions of extension of the first resistive element, the second resistive element, the third resistive element, and the fourth resistive element.

15. A semiconductor device configured to perform a process in response to a Hall element represented by an equivalent circuit in which a first resistive element, a second resistive element, a third resistive element, and a fourth resistive element are sequentially connected in a quadrangular loop,
wherein the semiconductor device is switched between a first mode and a second mode,
   wherein, in the first mode, a first connection point between the first resistive element and the second resistive element is set at a ground potential and a second connection point between the third resistive element and the fourth resistive element is set at a power supply potential, and a third connection point between the first resistive element and the fourth resistive element and a fourth connection point between the second resistive element and the third resistive element are set as output terminals, and
   wherein, in the second mode, the third connection point is set at the ground potential and the fourth connection point is set at the power supply potential and the first connection point and the second connection point are set as the output terminals, and
wherein, in the first mode, a first line that is located adjacent to the second resistive element and connected to the first connection point, and,
wherein, in the second mode, a second line that is located adjacent to the fourth resistive element and connected to the third connection point is set at the ground potential.

* * * * *